(12) United States Patent
Kim et al.

(10) Patent No.: US 7,249,058 B2
(45) Date of Patent: Jul. 24, 2007

(54) METHOD OF PROMOTING STRATEGIC DOCUMENTS BY BIAS RANKING OF SEARCH RESULTS

(75) Inventors: Moon Ju Kim, Wappingers Falls, NY (US); Juan-Leon Rodriguez, Pleasant Valley, NY (US); Yurdaer Nezihi Doganata, Chestnut Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 10/120,082

(22) Filed: Apr. 10, 2002

(65) Prior Publication Data

US 2003/0093338 A1    May 15, 2003

Related U.S. Application Data

(63) Continuation-in-part of application No. 10/054,301, filed on Nov. 13, 2001.

(51) Int. Cl.
    G06Q 30/00 (2006.01)
(52) U.S. Cl. .................................................. 705/26
(58) Field of Classification Search ................. 705/26, 705/27, 2
    See application file for complete search history.

(56) References Cited

U.S. PATENT DOCUMENTS

| 4,996,642 A | * | 2/1991 | Hey ........................... 705/27 |
| 5,598,557 A |   | 1/1997 | Doner et al. ................ 395/605 |
| 5,765,142 A |   | 6/1998 | Allred et al. ................ 705/26 |

(Continued)

FOREIGN PATENT DOCUMENTS

JP    2001043241 A  *  8/1999

OTHER PUBLICATIONS

The evolution of web searching, Green, David, Online Information review, pp. 124-137, 2000 ISSN.*

*Primary Examiner*—Florian Zeender
*Assistant Examiner*—O. Garcia Ade
(74) *Attorney, Agent, or Firm*—Norman Gundel

(57) ABSTRACT

A method, software and apparatus are provided which enable promotion of products and services in a deterministic manner free of conflicting actions modifying raw ranking data based on merchants interests. For this purpose, an information consolidator is provided to obtain search results for a plurality of sources including directly from merchants. When a shopper enters a set of key words in an entry field in an on-screen form for a web server to obtain a list of items (products and/or services) of interest to the shopper, the documents describing the items can be prioritized by the information provided by the information source based on the web sites owner's priorities. The information consolidator receives ranking information taking the highest ranked products and obtains the product information for the most highly ranked products. The information consolidator then reranks the products using a preferred ranking algorithm to remove information sources biases in this ranking of the products. The information consolidator can add weighting factors such as those covered in the copending applications by the merchant. The weighting factors are combined with the mentioned ranking mechanisms to the documents to increase the probability that certain items come to the top when the search results are presented to the shopper. These pages could be used to promote products or otherwise direct the selection shoppers. The weighting factors are configured so as to not decrease the shoppers confidence in the ranking process.

8 Claims, 9 Drawing Sheets

U.S. PATENT DOCUMENTS

| | | | |
|---|---|---|---|
| 6,038,668 A | 3/2000 | Chipman et al. | 713/201 |
| 6,078,892 A | 6/2000 | Anderson et al. | 705/10 |
| 6,098,065 A | 8/2000 | Skillen et al. | 707/3 |
| 6,119,101 A | 9/2000 | Peckover | 705/26 |
| 6,266,649 B1 * | 7/2001 | Linden et al. | 705/26 |
| 6,269,361 B1 | 7/2001 | Davis et al. | 707/3 |
| 6,289,353 B1 * | 9/2001 | Hazlehurst et al. | 707/102 |
| 6,292,894 B1 | 9/2001 | Chipman et al. | 713/168 |
| 6,324,534 B1 | 11/2001 | Neal et al. | 707/3 |
| 6,466,918 B1 * | 10/2002 | Spiegel et al. | 705/27 |
| 6,489,968 B1 * | 12/2002 | Ortega et al. | 715/713 |
| 6,741,969 B1 * | 5/2004 | Chen et al. | 705/14 |
| 2001/0014868 A1 | 8/2001 | Herz et al. | 705/14 |
| 2001/0037377 A1 | 11/2001 | Nakano et al. | 705/14 |
| 2001/0042060 A1 | 11/2001 | Rouse et al. | 707/1 |
| 2001/0042064 A1 | 11/2001 | Davis et al. | 707/3 |
| 2001/0047354 A1 | 11/2001 | Davis et al. | 707/3 |
| 2002/0002450 A1 * | 1/2002 | Nunberg et al. | 704/1 |
| 2002/0049701 A1 * | 4/2002 | Nabe et al. | 707/1 |
| 2002/0095411 A1 * | 7/2002 | Caldwell et al. | 707/5 |

* cited by examiner

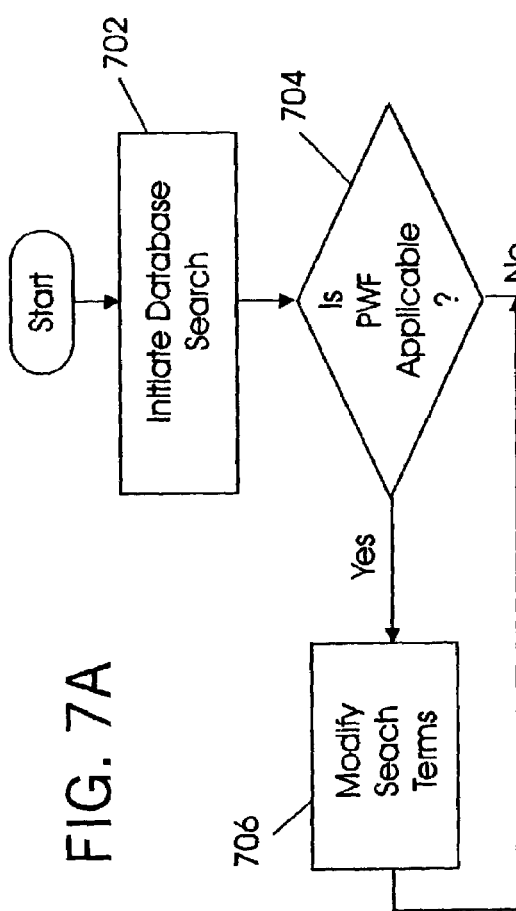
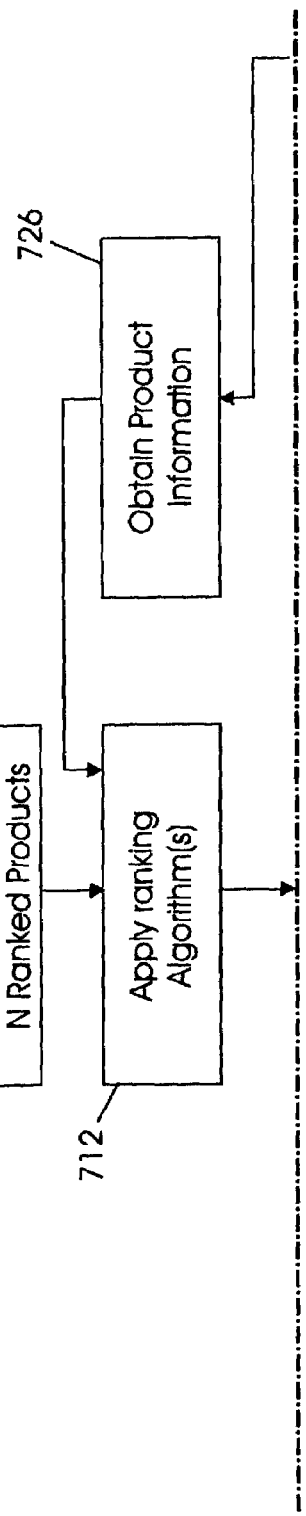
FIG. 7
| FIG. 7A |
| FIG. 7B |
FIG. 7A

METHOD OF PROMOTING STRATEGIC DOCUMENTS BY BIAS RANKING OF SEARCH RESULTS

RELATED APPLICATION

This is a continuation-in-part application for copending U.S. patent application Ser. No. 10/054,301 filed on Nov. 13, 2001 and entitled "Internet Strategic Brand Weighting Factor." The contents of this application are hereby incorporated by reference.

U.S. patent application Ser. No. 10/120,071 filed on even date herewith and entitled "Controlling Information Access by Bias Ranking of Search Results on a Web Browser."

FIELD OF THE INVENTION

The present invention relates to a system for customizing on-line service content presentations. More particularly, the present invention relates to brand weighting to offer product and services in a deterministic manner.

BACKGROUND OF THE INVENTION

Typically, shoppers browse selections offered by participating on-line merchants by specifying criteria regarding the type of product they would like to find such as the manufacturers product features or price tags. Based on product attributes entered by the shopper into a browser, such as Netscape, the browser interrogates the databases of on-line merchants for the product attributes entered by the shopper into the system. The system ranks the products turned up by the database search based on ranking algorithms which take into consideration various ranking factors, such as the number of occurrences of terms in documents, the proximity of terms to one another within the documents, etc., and provides the products to the seller listed in order of their rank.

While this method helps shoppers locate products and services they desire, it limits the amount of control shoppers have over the shopping environment and experience. Generally speaking, for the same set of database interrogations, each of the shoppers would receive the same set of results and in the same order. To tailor the presentations to the shopper, a number of systems analyze the on-line behavior of the shopper to vary characteristics and elements of the displays presented to the shoppers to the individual shopper's preferences and needs. The shopper's characteristics that may be used to tailor the presentations would include previous data on stores visited, time of the visit, length of the visit, merchandise viewed, purchases made, frequency of visits, etc. In addition, as described in the above mentioned U.S. patent application, Ser. No. 10/054,301, a weighting factor can be added by a seller to promote certain products. The weighting factor is combined with existing ranking mechanisms to the documents to increase the probability that certain items come to the top when the search results are presented to the shopper. These pages could be used to ensure shoppers do not overlook special offers or to reduce overstocks by promoting products with a large inventory. The weighting factor is configured so as to not decrease the shoppers confidence in the ranking process. Internet service providers also can provide a vehicle for sellers to skew search results to promote products. U.S. Pat. No. 6,269,361B1 provides a scheme where bidding affects the ranking of search results of a network information provider.

Therefore, it is an object of the present invention to provide a new way for an on-line merchant to emphasize products to on-line purchases.

Another object of the invention is to provide a new way to express a consistent marketing strategy.

It is another object of the invention to provide a way for merchants to promote certain products and services while avoiding promotion schemes of other merchants.

BRIEF DESCRIPTION OF THE INVENTION

In accordance with the present invention, a method, software and apparatus are provided which enable promotion of products and services in a deterministic manner free of conflicting actions modifying raw ranking data based on merchants interests. For this purpose, an information consolidator is provided to obtain search results for a plurality of sources including directly from merchants. When a shopper enters a set of key words in an entry field in an on-screen form for a web server to obtain a list of items (products and/or services) of interest to the shopper, the documents describing the items can be prioritized by the information provided by the information source based on the web sites owner's priorities. The information consolidator receives ranking information taking the highest ranked products and obtains the product information for the most highly ranked products. The information consolidator then reranks the products using a preferred ranking algorithm to remove information sources biases in this ranking of the products. The information consolidator can add weighting factors such as those covered in the copending applications by the merchant. The weighting factors are combined with the mentioned ranking mechanisms to the documents to increase the probability that certain items come to the top when the search results are presented to the shopper. These pages could be used to promote products or otherwise direct the selection shoppers. The weighting factors are configured so as to not decrease the shoppers confidence in the ranking process.

DETAILED DESCRIPTION OF THE INVENTION

Figure 1:
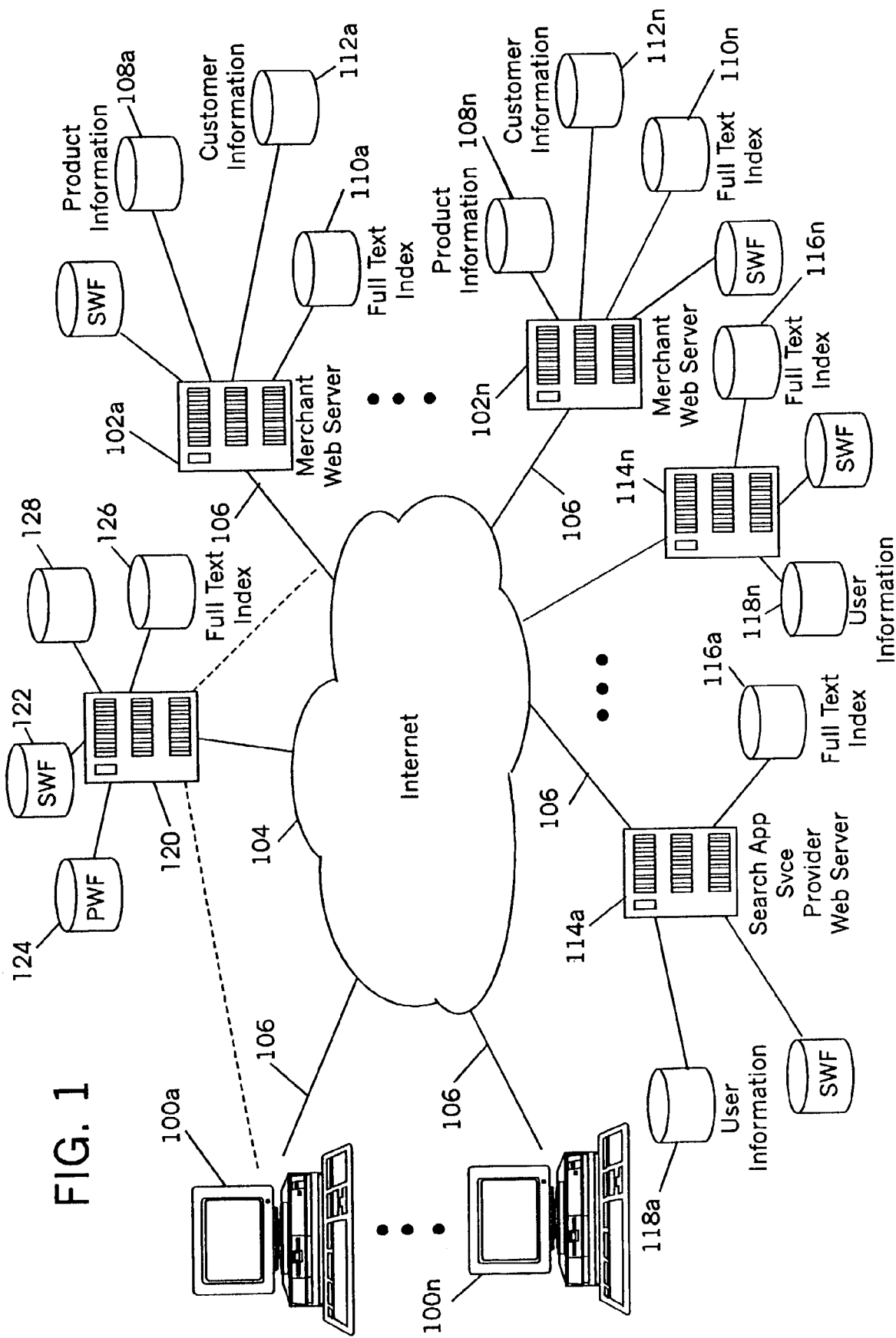
FIG. 1 is a system organization for an on-line service in a wide area network.

Referring now to FIG. 1, communication between a plurality of shoppers computers 100a to n and a plurality of merchants servers 102a to n is accomplished via an on-line service through a wide area network such as the Internet 104 that includes network node computers. The network node servers manage network traffic such as the communications between any given shopper's computer and merchant's server.

The shoppers' computers 100 are equipped with communications software, including a WWW browser such as the Netscape browser of Netscape Communications Corporation, that allows a shopper to connect and use on-line shopping services via the Internet. The software on a shopper's computer 100 manages the display of information received from the merchants to the shopper and communicates the shopper's actions back to the appropriate merchant servers 102 so that additional display information may be presented to the shopper or the shoppers selections acted on. The connections 106 to the network nodes of the Internet may be established via a modem or other means such as a cable connection.

Information regarding the merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, there are the servers 114 of a plurality of search engine service providers web pages, such as Google of Google Inc., which maintain full text indexes 116 of the products of the individual merchants 102a to 102n obtained by interrogating the product information databases 108 of the individual merchants.

In accordance with the present invention, an information consolidator 120 is provided. An information consolidator obtains information from various ones of the merchant servers 102 and those of the search application service providers 114 and supplies it to a user. The information consolidator may be an independent source for data, or as shown by the dotted lines, associated with a merchant 102a or be the user 100a obtaining the data.

The information consolidator provides added value by modification of the data it receives from its sources. As pointed out, the ranking of data provided by the merchant or search application service provider varies from that provided by ranking elements either to be helpful to the user or to add biases of the data provider. For instance, the merchants and the search application service providers each may maintain a database of information about shoppers and their buying habits to customize on-line shopping for the shopper. Operations to accomplish a customized electronic shopping environment for the shopper include accumulating data regarding the shopper's preferences. Raw data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g., age, address, hobbies) regarding the shopper as provided by the shopper when subscribing to the service. The data accumulated on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

Figure 2:
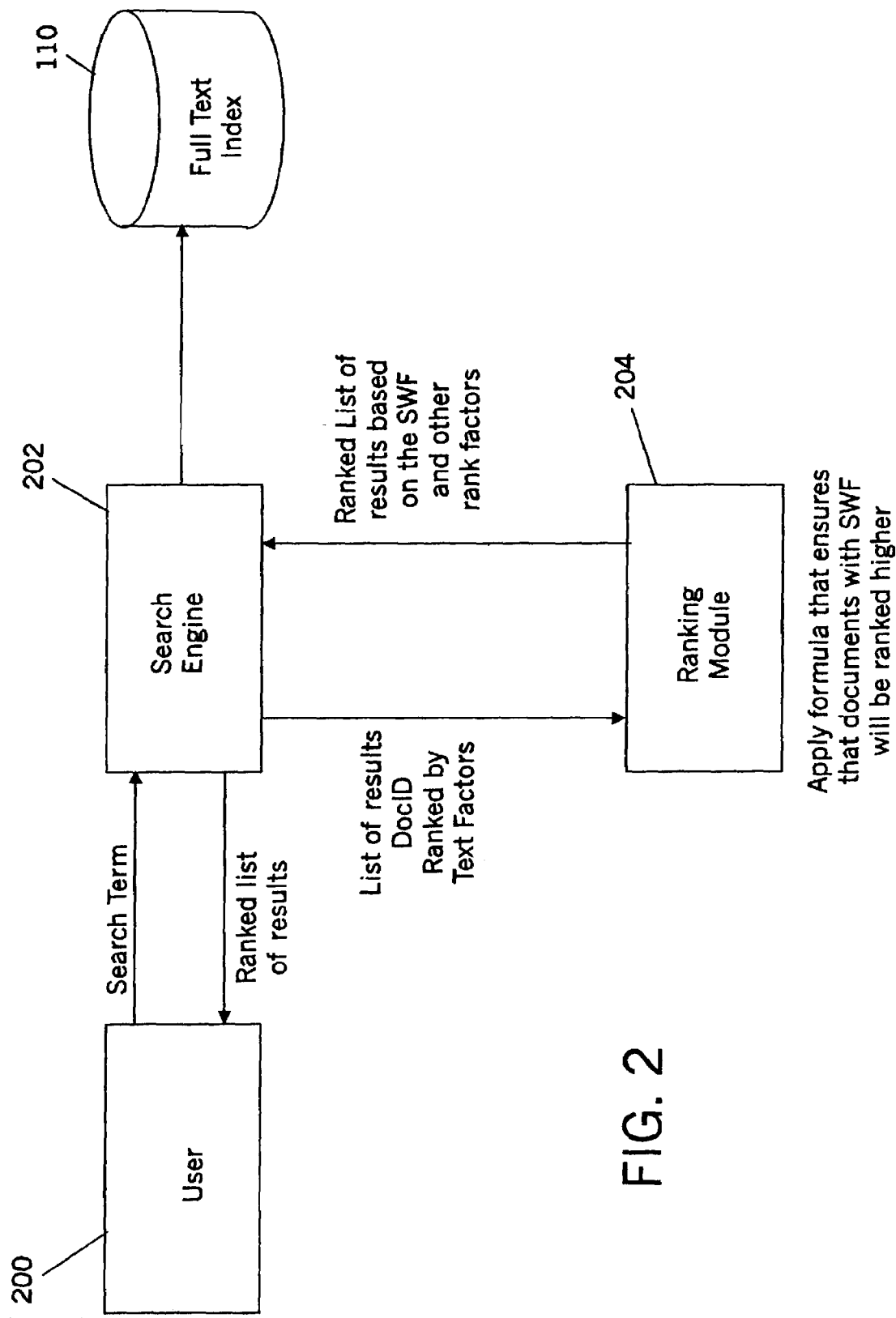
FIG. 2 is a flow chart of a system for providing ranking in accordance with the present invention.

As shown in FIG. 2, when the search characteristics in the form for key words are entered by the shopper 200 into the space provided on the default or home page of his/her browser, the search engine 202 of the merchant web server 102 does a search of the accessed full text index database 110 or 118 using the key words and gets a list of documents describing those products and services that contain matches to the key words. This list of documents contain basic text ranking Tf (including the number of hits, their location, etc. which are used to order the list of documents) with documents with higher scores at the top. This list is then sent to the ranking module 204 which will apply a ranking algorithm, such as the one described in the article entitled "The Anatomy of a Large-Scale Hypertextual Web Search Engine" by Sergey Brin and Lawrence Page of the Computer Science Department, Stanford University, Stanford Calif. 94305 (which article is hereby incorporated by reference) to rank the list of documents using the text factors and other rank factors, such as link analysis LA, popularity, the user's preferences Up from profile, etc. and return a reordered list of documents, with documents with higher scores at the top by providing each of the articles with a Rank Factors Score which is a number that varies from "0" to "1" so that $$\text{Rank Factor Score} = F(w \% \ T\!f + \% \ \times \text{Popularity} + y \% \ LA + z \% \ Up + \ldots) \quad (1)$$

where

F is the algorithmic function; and w, x, y+z are proportions applied to the various ranking factors by the algorithmic function F.

Ranking algorithms may differ from one another and the Rank Factors Score generated from any given algorithm may not take into account all the rank factors listed above and may take into account other rank factors. The user of the data may have preferences for different factors or proportions than those provided by the merchants and search application providers.

Figure 3:
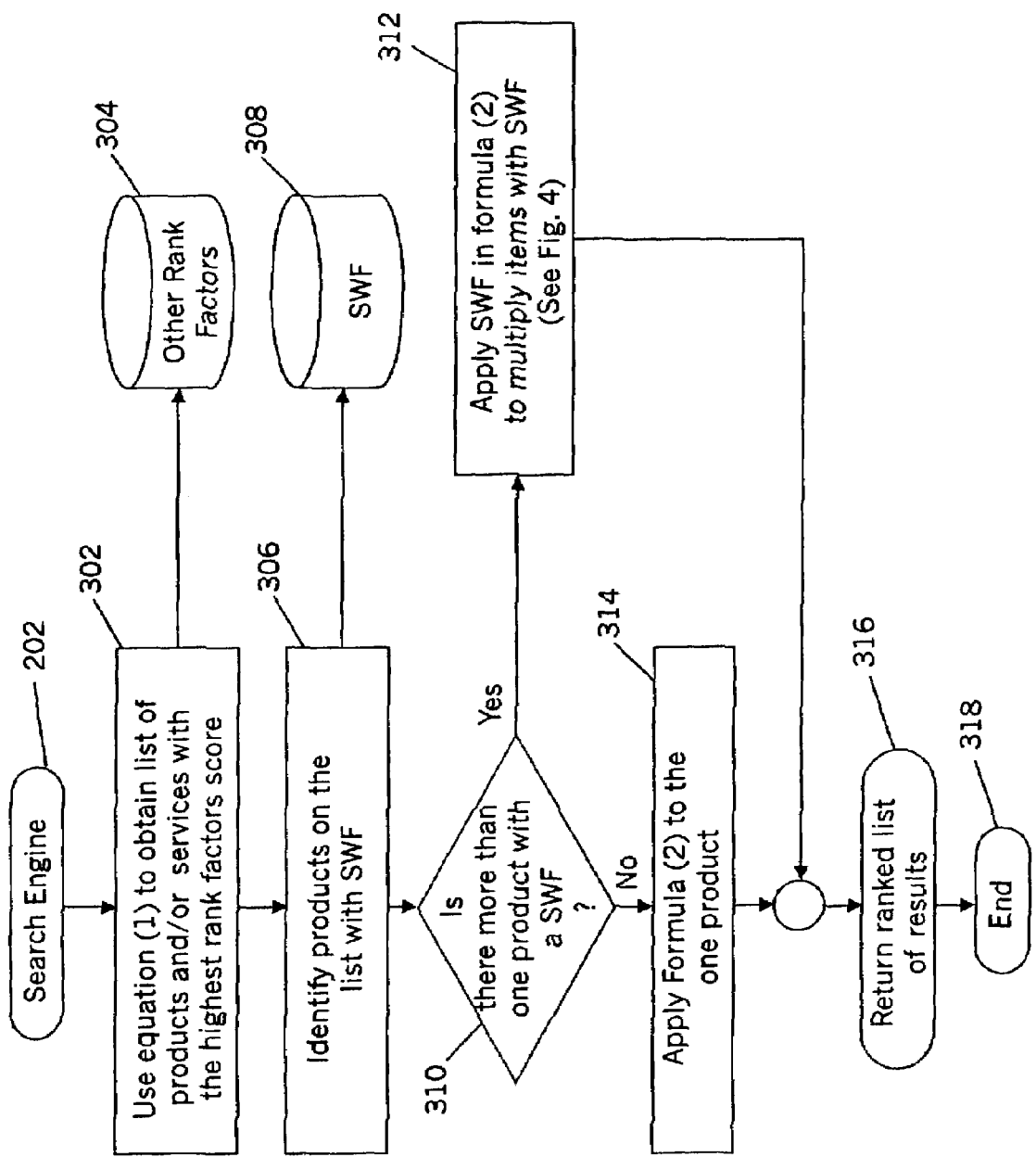
FIG. 3 is a more detailed flow chart for the ranking module for the present invention.

Another factor that may skew the raw results of a search are introduction of biases of the search application provider or the merchant. For instance as pointed out, the above mentioned U.S. Patent provides for establishing an auction for ranking of data in which product sellers would bid for priority in presenting information turned up by a search. In addition in accordance with previously mentioned patent application No. 10/054,301, a strategic weighting factor (SWF) is used to promote one or more products of the merchant in accordance with the wishes of the product's merchant. For application of the weighting factor, an analysis must be done of terms found in documents that belong to common categories. To accomplish this, a document identifying the product must contain a number of words that commonly define the product. Such words are synonyms of the product and other words related to the products. For instance, the IBM Think Pad 550 product document would have words like laptop, thinkpad, notebook, companion computer, etc. Once identifying the product to be promoted and its document using the terms, the product document is given a weighting factor which varies from zero to one and it's stored in SWF database 308 as shown in FIG. 3. The ranking is then applied to the of the content in accordance with the following formula.

$$R = 1-n \text{ (Rank Factors Score)} + n \text{(SWF Factor)} \qquad (2)$$

where:
 n=a number between zero and one inclusive. (A recommended value of n is 0.5 when both the Rank Factors Score and the SWF Factor vary from 1 to 0.)
 SWF=is the weighting factor for the merchants marketing strategy.

As pointed out above, the first bracketed portion (Rank Factors Score) is a function F of the applied ranking factors such as the text factors Tf (including the number of occurrences of key words in documents, proximity of key words in documents, location of keywords in documents), and other ranking factors such as the documents' popularity (including the number of times a given document has be accessed by shoppers, number of incoming links to this documents, etc.) The second bracketed category (SWF factor) is the weighting factor provided by the merchant to emphasize products he is interested in selling or products which he thinks the shopper may be interested in and not accounted for by the other weighting factors relating to the shopper's preferences. It can be seen that the above formula not only takes into account the merchant's marketing desires but provides them as a portion of the weighting factors in the ranking so that the merchant's desires do not necessarily outweigh other considerations and may vary to critical importance to insignificance in the ranking consideration.

Usually, care taken not to overload the ranking by the SWF factor so that the shopper does not become confused by the presentation he receives relationship to his key word attributes. For instance, the value of 0.5 is selected for n when both the Rank Factors Score and the SWF range between 0 and 1. Another value for n may be more appropriate to maintain a proper relationship between the bracketed terms when other values are applied either by the algorithm or the merchant. Another factor to be avoided is the elimination of worthy candidates from the list by a lesser candidate having a high SWF Factor. This is eliminated by choosing the highest ranked products using the text ranking factors first then applying the SWF Factor after the application of the algorithmetic function so that the SWF Factor does not eliminate any of the worthy candidates but only changes the relative ranking of such worthy candidates.

Figure 5:
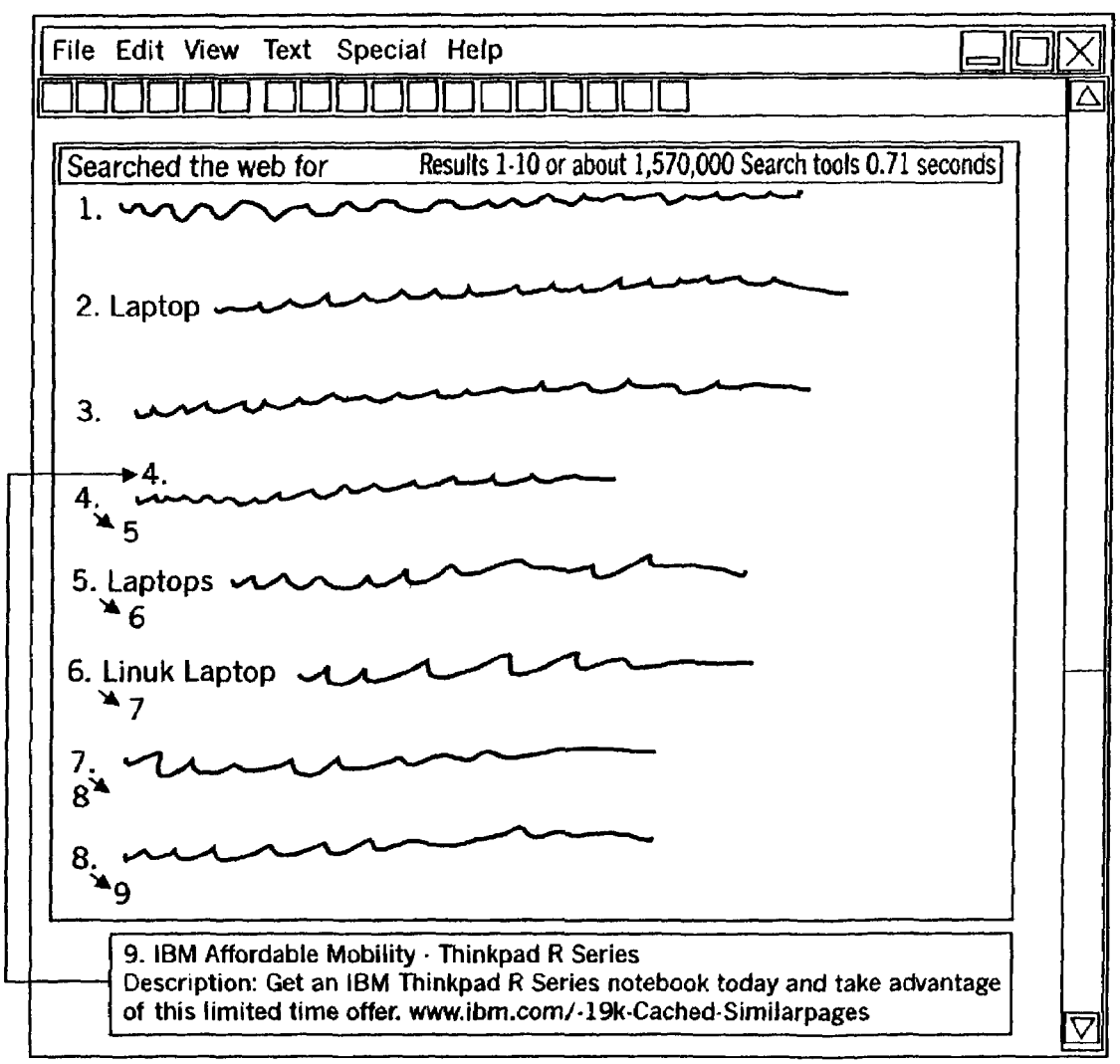
FIG. 5 is a diagram of data by rank provided to a shopper's computer screen.

FIG. 3 shows how the SWF factor is added to the search results to obtain the ultimate ranking of the products turned up by the search in the fill text database 110. The search engine 202 provides the hits obtained from the document search in the appropriate full text indexes 110 and/or 118 using the search terms provided by the shopper. The ranking factors 204, other than the SWF weighting factor, are applied to the count in step 302 to get a list of products and/or services (say ten) with the highest Rank Factor Score. The products and/or services on the list obtained by step 302 are then analyzed in step 306 to determine if any of them have a SWF weighting factor 308 applied to them. If there is only one product with a SWF, then Formula (2) is applied to that particular product 314 in the list and its rank is changed relative to the other products on the list in accordance with the results obtained with Formula (1). For instance as shown in FIG. 5, assume an article about a product with a SWF, such as a Thinkpad R Series Laptop, was ninth on the initial list and after application of its SWF in Formula (2) its R is the fourth highest, its rank would change from 9th to 4th as shown and the products ranked 4th to 8th would be changed accordingly.

Figure 4:
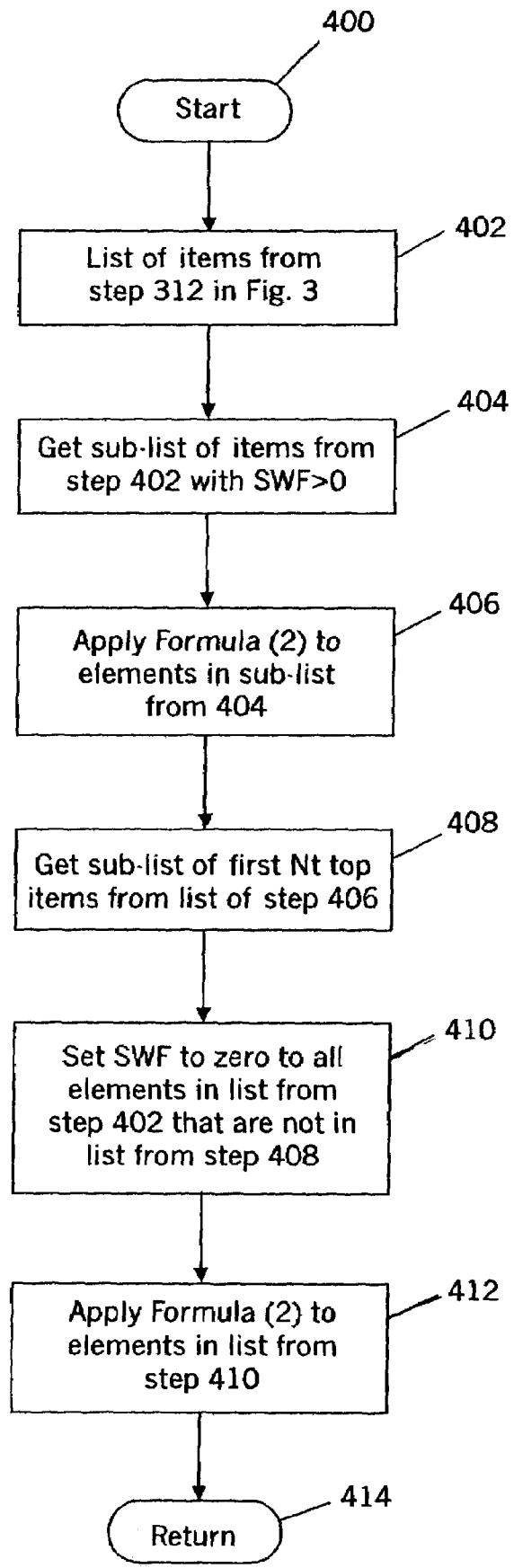
FIG. 4 a flow chart with the logic to apply.

A problem exists when too many of the worthy candidates has a SWF Factor greater than zero. If there are more than one product with the weighting factor, then the SWF is applied to the list of results taking into consideration multiple items with SWF greater than zero in step 312 in accordance with the process shown in FIG. 4. In step 402 of FIG. 4, a list of items is received from step 312 in FIG. 3. Then in step 404 a new list is created from output of step 402 containing all items with SWF greater than zero. Output of 404 is then applied Formula (1) to each on the list generated in step 406. Then a new sub-list of a limited number, Nt, of the items with the top Ranking R from the output of step 404 is selected in step 408, this will ensure than only a Nt (predefined value greater than zero) number of items with SWF are taken into consideration. The SWF of all items from output list of step 402 that are not of the sublist generated in step 408 are set to zero and Formula (2) is applied to the items on the items selected by Formula (1) to reorder the rank of the items.

Figure 6:
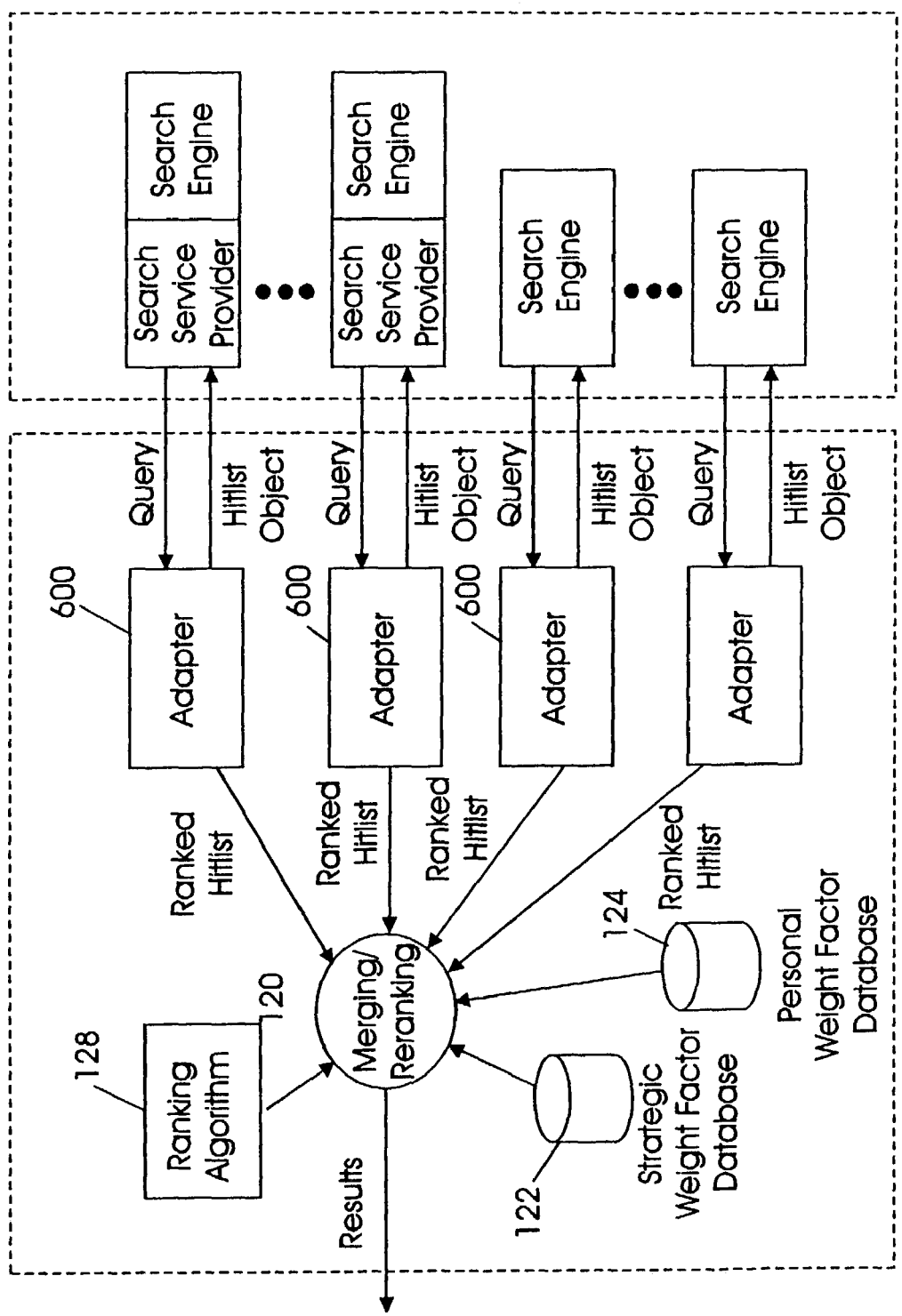
FIG. 6 is a block diagram for operation of the information consolidator.

Referring now to FIGS. 1 and 6, the information consolidator 120 maintains its own strategic weight factor SWF and/or user preference weight factor PWF databases 122 and 124. While the strategic weight factor database adds a factor to the obtained raw ranking results to promote a merchants product, the user preference factor can be a positive or negative factor and not only affects the obtained raw ranking results, but as discussed hereinafter, also modifies the search query provided by the user by modifying or adding search terms. The user preference factor can be used for the user to express his or her personal preferences or interests. It can also be used by the employer of the user to restrict the goods presented to the user. For instance, the user's position in the company may be taken into account by placing a price limit in the search term on the goods which the user can order. Also, the ability of the user's company to service goods or past history with the goods of certain suppliers may be considered in establishing the search terms of the PWF. In this way, alternatives of the requested products could be provided for consideration of the user and products which do not have the employer's approval for the user could be flagged to indicate managerial approval will be required. In certain cases, outside corporations are hired to provide data processing services for a company in such as a case both SWF and PWF databases 122 and 124 may be present: one database providing a PWF indicating the users preference and the other providing the SWF indicating products being promoted by the service provider. Coordination may be necessary to avoid conflicting purposes.

Besides the SWF and PWF databases 122 and 124, the information consolidator has a database 126 for storing full test indexes and product information for the products that turn up in the search. The consolidator 120 also has its own ranking algorithm database 128 containing the raw algorithm with the ranking factors preferred by the consolidator or its user to obtain the raw ranking data.

Figure 7B:
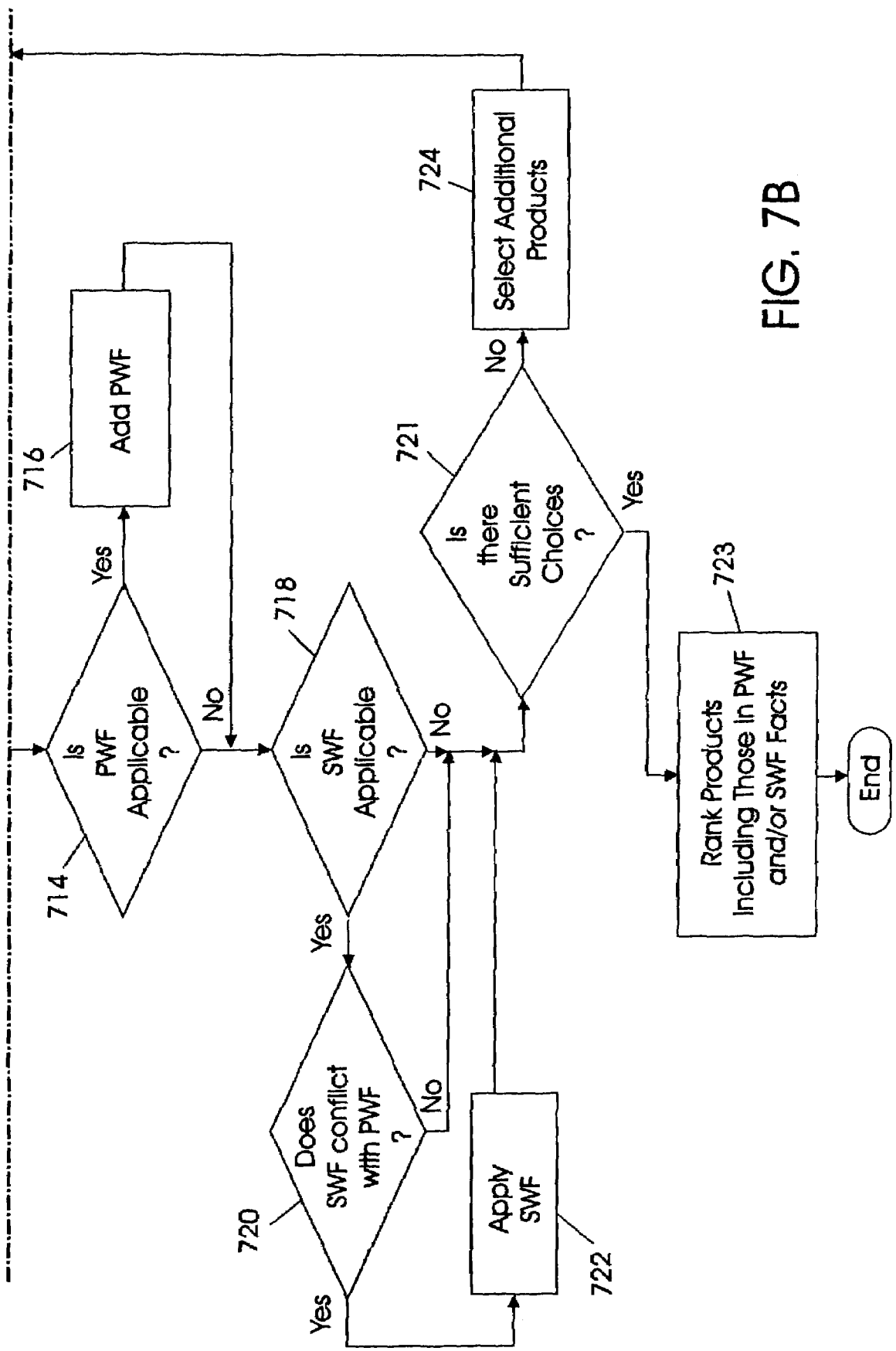
FIG. 7 is a flow diagram showing the operation of the information consolidator.

As shown in FIGS. 6 and 7, the consolidator 120 performs a database search (step 702) through software 600 providing a ranked hit list from each of the sources 102*a* to 102*n* and 114*a* to 114*n*. In performing the search, it is determined (step 704) whether the PWF factor 124 is involved in the search if it is the search terms are modified (step 706) as discussed hereinafter in connection with FIGS. 8 and 9 and the search is performed with the modified search terms otherwise the search is performed with the original search terms (search terms provided by the user) and the search results are obtained from its sources (step 708). The consolidator then obtains product information for the N products ranked highest by its sources (step 710). The determination of which products from the multiple sources are the Nth highest ranked can be arrived at in a number of ways; for instance, it could on the basis of raw highest ranking of products, it could be by concurrence among the sources or it could be by selection of the highest ranked products from each of the sources. Other selection approaches can also be taken.

Ranking algorithms of the consolidator are then applied to the products (step 712). Again it is determined if the PWF factor is involved (step 714). If it is, the PWF factor is added as described hereinafter in connection with FIGS. 8 and 9 (step 716). Whether the PWF factor is involved or not, it is determined if the SWF factor is applicable to each of the products (step 718) and if it does not conflict with the purposes of the PWF (step 720). If the SWF factor is applicable, it is added (step 722) as described previously and if there are sufficient choices (step 720). The ranking of the products is provided (step 722). If there is an insufficient selection of products, additional products are selected (step 724) then product information is obtained (step 726) and the process of steps 712 to 726 is repeated.

The products ranked by this process can include those with or without applicable PWF and SWF factors. As shown in FIG. 5, and the application of either or both the PWF and SWF factors may result in the ranking of one or more of the products changing as described previously in connection with the changes in ranking resulting from a SWF being provided to the Thinkpad initially ranked 9th.

Figure 8:
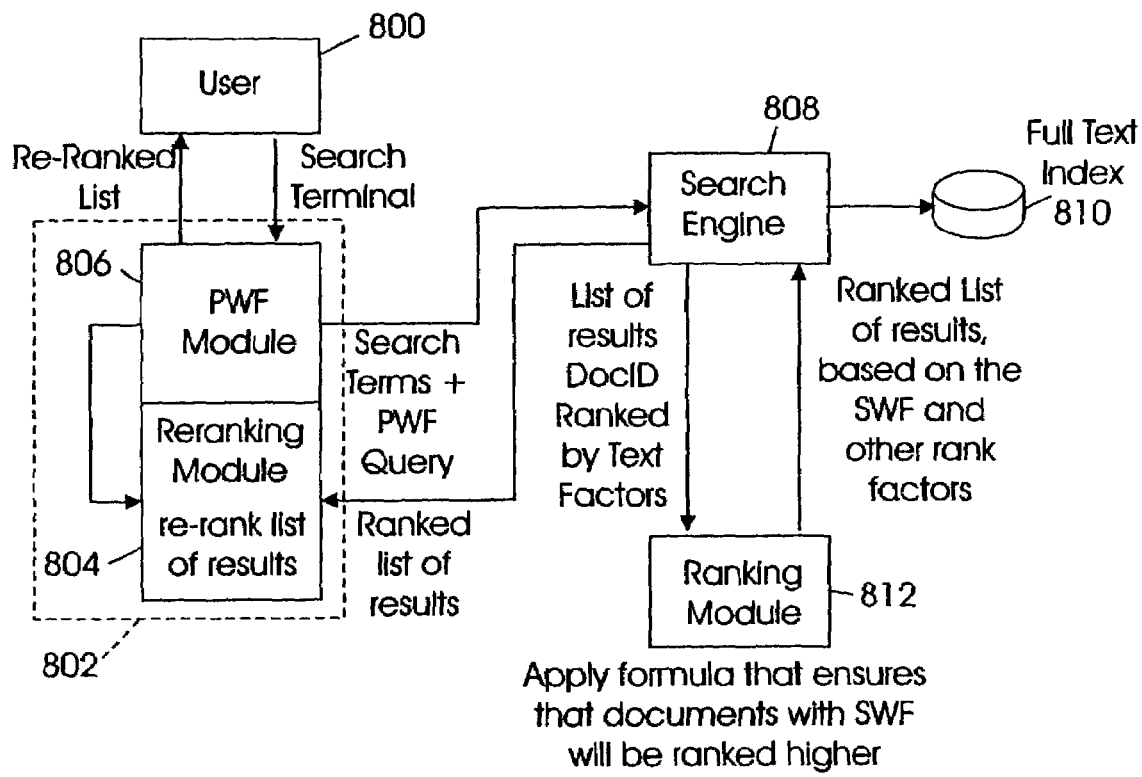
FIG. 8 is a block diagram for use of PWR.
Figure 9:
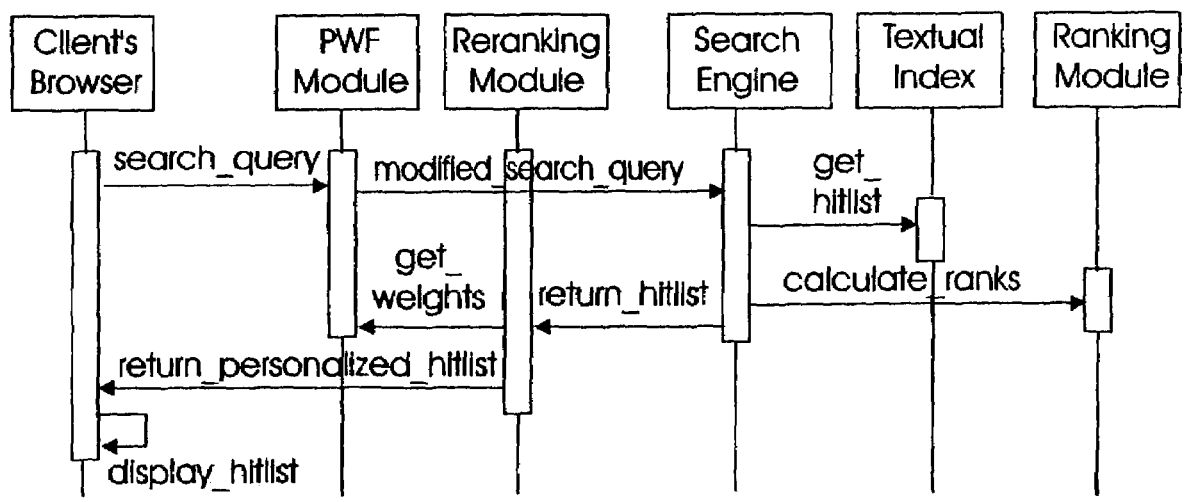
FIG. 9 is a timing diagram for the PWR.

FIGS. 8 and 9 show reranking based on a user preference weight factor (PWF). The PWF factor enables a user or a controlling agent, such as the users management or parents or their agents, to provide search results relevant to the user. The PWF based solution differs from the SWF based solution because the PWF is not assigned directly to a set of documents like the SWF. Instead, the PWF factor is assigned to particular query terms or to certain parameters or a certain set of parameters can be added to the search query. When a user enters a query term to the search system, the user preference weight factor assigns the PWF to certain key words or adds a certain set of parameters to the search query. The result list is ranked by the search engine using a search engine dependent ranking algorithm. The ranking algorithm usually depends on the frequency and the distribution of the query terms.

As shown in FIG. 8, if the PWF modules are located in the browser of the user's machine 100a instead of the consolidator's server the user 800 sends a query to the search service application via the client browser 802. The client browser has two additional modules: the reranking algorithm module 804 and the user PWF module 806. When the user types a key word for search, additional key words or parameters that are based on the user PWF are attached to the query by the user PWF module 802. Additional search parameters will narrow the scope of returned results by limiting the search to the categories, associated with the PWF. For instance, a price limitation could be placed on goods to be ordered by an employee's manager, the changes could express particular interest to the user, or the terms could limit the range of choices available to children. At the same time, the attached key words will raise the rank of documents that contain the added words in combination with the original user query terms. The query string is then sent to the search engine 808 interrogates the database 808 and obtains a list of results (hits) with their original scores. An entry of this list contains the list of keywords for every document, and the corresponding Url where the document resides. This result (hit) is then forwarded to the ranking module 812 which provides ranked results based on factors described in connection with formulas (1) and (2). The ranked results are provided to the rerankinig modules 806.

The reranking module 804 fetches the search modification factors from the PWF module 806 and reranks hits by using the reranking algorithm and the modification factors generated by the PWF modules 806. To enable fast reranking (without the need to analyze the document contents) the returned hits should be accompanied with the statistical characteristics, like frequency and distribution of the query terms, that were used by the search engine to calculate the original rank of each hit. These parameters should be returned by a search service application as an integral part of search results. In other words, these parameters should be included in the API of search service applications. The user preference weight factor module consists of the key words and the weight numbers of the key words based on the user input. Based on the user preference and interest, different weight numbers will be assigned. The reranking algorithm applies the weight numbers to the original statistical characteristics for selected key words, and updates ranks of returned hits. The reranking algorithm can take in factors, such as those mentioned in connection with Formula (1), except the factors are those provided by the user not those perceived by a merchant or internet service provider. The reranked search results are then sent to the user for retrieval. FIG. 9 shows the sequencing of the objects shown in FIG. 8.

Above we have described one embodiment of the invention. Modification of this described embodiment of the invention may be made by those skilled in the art. Therefore the invention is not limited to the described embodiment but includes all variations within the spirit and scope of the claims.

The invention claimed is:

1. A method for enabling an on-line merchant to tailor a response to a shopper's on-line interrogation comprising:
    obtaining rankings and descriptions of products or services from a plurality of sources including at least one on-line merchant and one on-line service provider;
    reranking by a rerankers of the products or services at least partially based on a count of hits to product descriptions in the merchant databases in response to on-line requests of the shopper specifying characteristics of a product or services desired by the shopper;
    modifying the ranking of at least one of the products ranked by the reranking, which modification is by a weighting factor based on a product strategy of the reranker so that the ranking is in accordance with the following formula:

$R = 1-n$ Rank Factors Score$+n$(weighting factor)

where: Rank Factors Score is a score resulting from the reranking
       n is a number less than 1 representing the proportion of the adjustment applied to the weighting factor
       R=Rank; and
    providing a presentation of products or services to the shopper that presents the products in order of rank determined by both the initial ranking and the modification of at least one of the reranked products.

2. The method of claim 1 including using other reranking factors in the reranking for taking into account other adjustments of tailor the presentation.

3. The method of claim 2, wherein the other reranking factors include factors for the customer's buying preferences and product popularity.

4. The method of claim 1 including using the weighting factor to modify the ranking of a group of a merchants products based on the rerankers product strategy.

5. The method of claim 4 including limiting the highest ranked of the group for insertion into the presentation prior to application of the SWF factor.

6. A computer software product on a computer usable medium for enabling an on-line merchant to tailor a response to a shopper's on-line interrogations, said software comprising:

computer code for obtaining the rankings and descriptions of products offered on the internet from a plurality of sources including at least one on-line merchant and one on-line service provider;

reranking computer code for reranking the products offered on the internet based on a count of hits in product descriptions to on-line requests specifying characteristics of a product desired by the shopper including other reranking computer code for taking into account other ranking factors, the other ranking factors include the customer's buying characteristics and a product's popularity;

weighting computer code for modification of the rank of at least one of the reranked products by the ranking computer code, which modification is based on the rerankers product strategy so that the ranking of the at least one product is in accordance with the following formula:

$$R=1-n\ [F(\%\ wTf+x\ \%\ Popularity+y\ \%\ LA)]+n\ (weighting\ factor)$$

where:
n is a number less than 1 representing the proportion applied to the weighting factor
w, x and y=proportions applied to the other weighting factors
Popularity=product popularity conforming to the raw weighting factor
LA=users past buying practice
Tf=Text Factors
F is a function of % w Tf+x % Popularity+y % LA; and
transmission software for providing a presentation of merchants products to the customer that presents a plurality of the reranked products in order of rank, where the rank of at least one of the products is determined by both the ranking and weighting computer code.

7. A method for enabling an on-line information consolidator to tailor a response to a shopper's on-line interrogation, said method comprising:

obtaining the rankings and descriptions of products or services from a plurality of web site sources including those of at least one on-line merchant and one on-line service provider which obtained rankings are based on each web site sources priorities;

reranking the products or services based on the web site sources priorities to priorities of the information consolidator to provide a rank factors score service;

modifying the reranking of at least one of the products or services ranked by the information consolidator which modification is by a weighting factor based on a presentation strategy of the information consolidator so that the ranking of the at least one of the reranked products is in accordance with the following formula:

$$R=1-nF[\text{rank factors score}]+n(\text{weighting factor})$$

where:
F is a function of the rank factors score
n is a number less than 1 representing the proportion of the adjustment applied to the weighting factor
R Rank; and providing a presentation of products to the customer that presents the products in order of rank determined by both the initial reranking and the modification of the at least one of the reranked products based on the presentation strategy of the information consolidator.

8. A server for enabling an on-line information consolidator to tailor a response to a shopper's on-line interrogation comprising:

search engine for obtaining the rankings and descriptions of products or services from a plurality of web site sources including those of at least one on-line merchant and one on-line service provider which obtained rankings are based on each web site sources priorities;

a reranking module for reranking the products or services based on the web site sources priorities to priorities of the information consolidator to provide a rank factors score service;

a weighting factor module for modifying the reranking of at least one of the products or services ranked by the information consolidator which modification is by a weighting factor based on a presentation strategy of the information consolidator so that the ranking of the at least one of the reranked products is in accordance with the following formula:

$$R=1-nF[\text{rank factors score}]+n(\text{weighting factor})$$

where:
F is a function of the rank factors score
n is a number less than 1 representing the proportion of the adjustment applied to the weighting factor
R Rank; and a broadcasting module for providing a presentation of products to the customer that presents the products in order of rank determined by both the initial reranking and the modification of the at least one of the reranked products based on the presentation strategy of the information consolidator.

* * * * *